United States Patent
Mech et al.

(10) Patent No.: US 7,064,755 B2
(45) Date of Patent: Jun. 20, 2006

(54) SYSTEM AND METHOD FOR IMPLEMENTING SHADOWS USING PRE-COMPUTED TEXTURES

(75) Inventors: Radomir Mech, Mountain View, CA (US); Yair Kurzion, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 467 days.

(21) Appl. No.: 10/153,690

(22) Filed: May 24, 2002

(65) Prior Publication Data

US 2003/0218610 A1 Nov. 27, 2003

(51) Int. Cl.
*G06T 15/50* (2006.01)

(52) U.S. Cl. ........................................ 345/426; 345/582
(58) Field of Classification Search ................ 345/426, 345/582
See application file for complete search history.

(56) References Cited

U.S. PATENT DOCUMENTS

| | | | |
|---|---|---|---|
| 5,870,098 A | * | 2/1999 | Gardiner .................... 345/426 |
| 6,182,127 B1 | | 1/2001 | Cronin, III et al. ......... 709/219 |
| 6,195,099 B1 | | 2/2001 | Gardiner .................... 435/426 |
| 6,323,870 B1 | | 11/2001 | Newhall, Jr. ............... 345/582 |
| 6,362,822 B1 | | 3/2002 | Randel ...................... 345/426 |

* cited by examiner

*Primary Examiner*—Kimbinh T. Nguyen
(74) *Attorney, Agent, or Firm*—Sterne, Kessler, Goldstein & Fox P.L.L.C.

(57) ABSTRACT

The present invention provides an improved system and method for rendering shadows in a computer graphics system. Textures representing the area of influence resulting from a combination of light sources and shadow casters are pre-computed. Scenes are then rendered using the pre-computed textures. A first step entails generating sets of directions and associated pre-computed textures for each light source and shadow caster pair in a simulation frame. Next, a first scene in the simulation is rendered. During this step one or more of the pre-computed textures are used to darken the area of influence or shadow portion of the scene.

16 Claims, 13 Drawing Sheets

FIG. 1A
CASE 1 : 1 LIGHT SOURCE AND 1 SHADOW CASTER
LIGHT SOURCE $S_1$
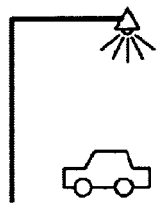
SHADOW CASTER $C_1$
PAIR $S_1 C_1$:
8 DIRECTIONS 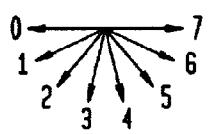
8 TEXTURES    A,B,C,D,E,F,G,H
SET:   DIRECTION 0    TEXTURE A
       DIRECTION 1    TEXTURE B
       ⋮                ⋮
       DIRECTION 7    TEXTURE H FIG. 1B
CASE 2 : 1 LIGHT SOURCE AND 2 SHADOW CASTERS
LIGHT SOURCE $S_1$
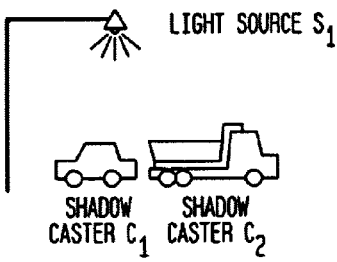
SHADOW CASTER $C_1$   SHADOW CASTER $C_2$
PAIR $S_1C_1$:
8 DIRECTIONS 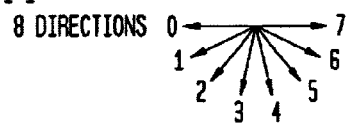
8 TEXTURES    A,B,C,D,E,F,G,H
SET 1:  DIRECTION 0    TEXTURE A
        ⋮              ⋮
        DIRECTION 7    TEXTURE H
PAIR $S_1C_2$:
5 DIRECTIONS 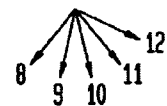
5 TEXTURES    I,J,K,L,M
SET 2:  DIRECTION 8    TEXTURE I
        DIRECTION 9    TEXTURE J
        ⋮              ⋮
        DIRECTION 12   TEXTURE M

FIG. 1C
CASE 3 : 2 LIGHT SOURCES AND 2 SHADOW CASTERS - LIGHT SOURCES USE THE SAME SET OF TEXTURES
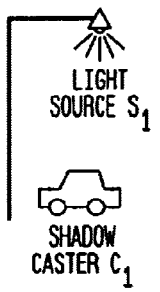
LIGHT SOURCE $S_1$
SHADOW CASTER $C_1$
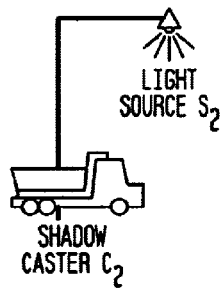
LIGHT SOURCE $S_2$
SHADOW CASTER $C_2$
PAIR $S_1C_1$:
8 DIRECTIONS 0, 1, 2, 3, 4, 5, 6, 7
8 TEXTURES    A,B,C,D,E,F,G,H
SET 1:   DIRECTION 0    TEXTURE A
          ⋮                ⋮
         DIRECTION 7    TEXTURE H
PAIR $S_1C_2$:
5 DIRECTIONS 8, 9, 10, 11, 12
5 TEXTURES    I,J,K,L,M
SET 2:   DIRECTION 8    TEXTURE I
          ⋮                ⋮
         DIRECTION 12   TEXTURE M
PAIR $S_2C_1$: USES SET 1
PAIR $S_2C_2$: USES SET 2

FIG. 1D
CASE 4 : 2 LIGHT SOURCES AND 2 CASTERS
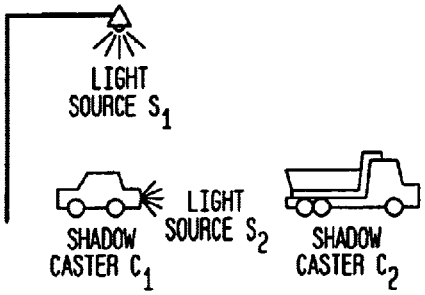
PAIR $S_1C_1$:
  8 DIRECTIONS 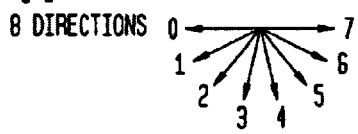
  8 TEXTURES   A,B,C,D,E,F,G,H
  SET 1:   DIRECTION 0    TEXTURE A
              ⋮              ⋮
           DIRECTION 7    TEXTURE H
PAIR $S_1C_2$:
  5 DIRECTIONS 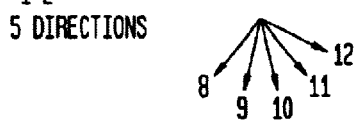
  5 TEXTURES   I,J,K,L,M
  SET 2:   DIRECTION 8    TEXTURE I
              ⋮              ⋮
           DIRECTION 12   TEXTURE M
PAIR $S_2C_2$:
  4 DIRECTIONS 
  4 TEXTURES   N,O,P,Q
  SET 2:   DIRECTION 13   TEXTURE N
              ⋮              ⋮
           DIRECTION 16   TEXTURE Q

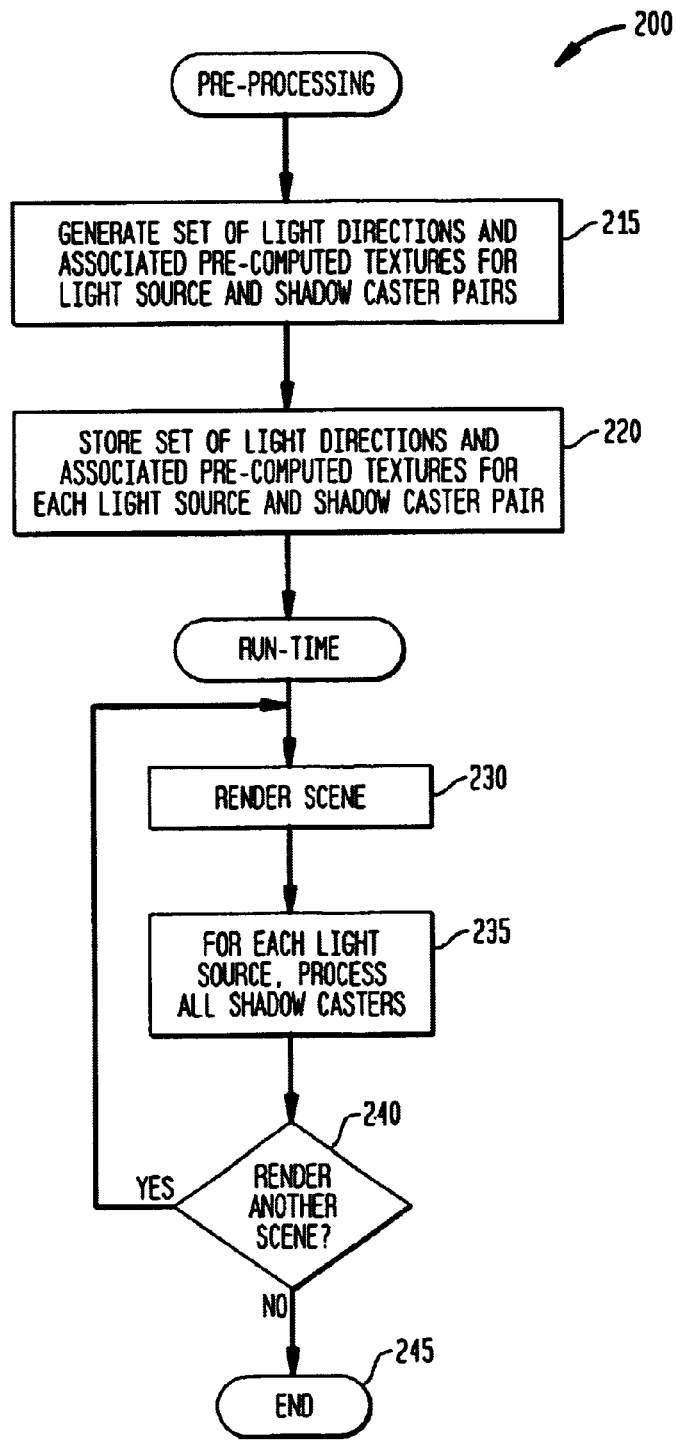

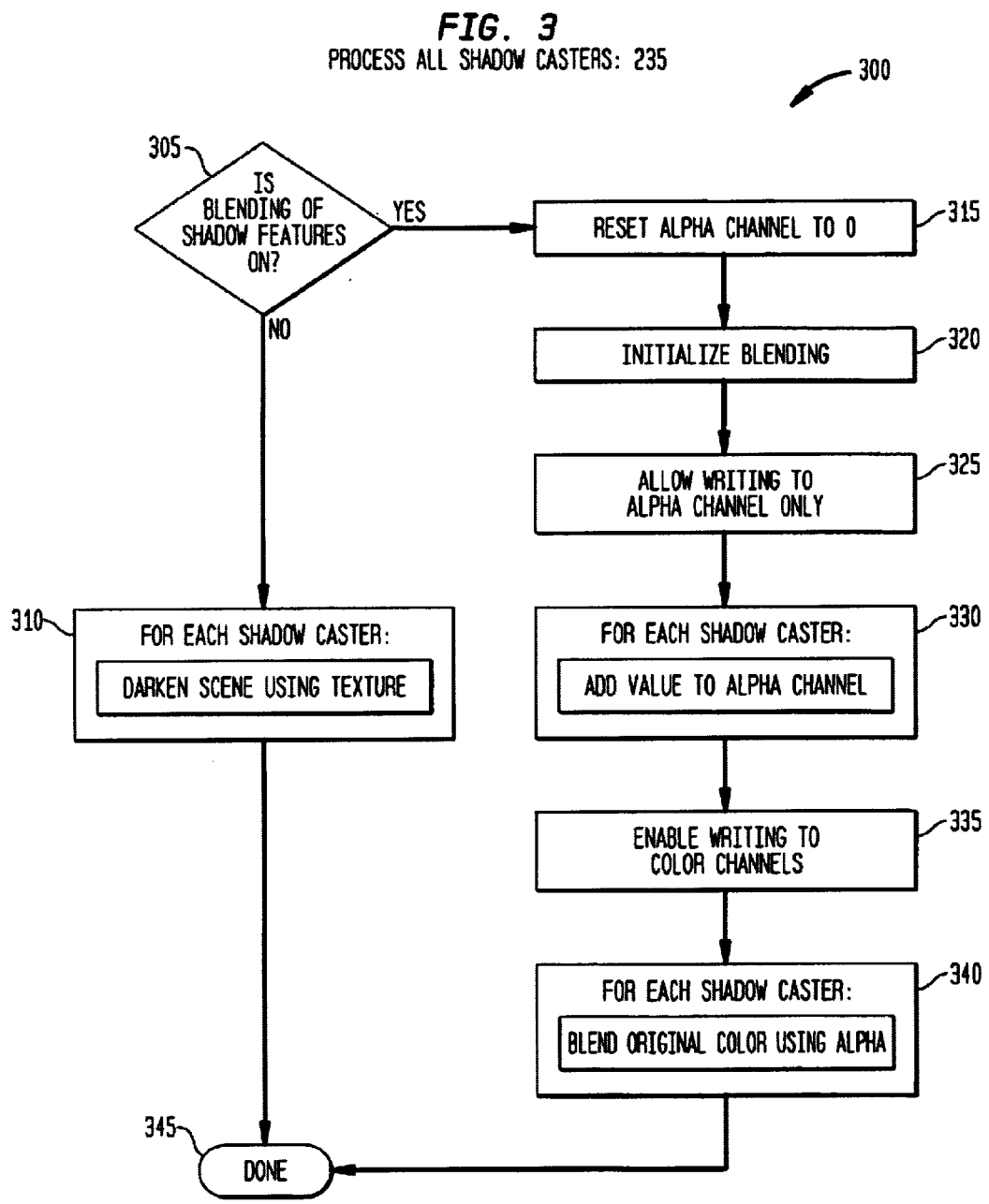

DARKEN SCENE USING TEXTURE: 310

CHOOSE CLOSEST TEXTURE: 410

DETERMINE CURRENT LIGHT DIRECTION: 505

DRAW AREA OF INFLUENCE WITH TEXTURE: 425

ADD ROTATE AND SCALE TO TEXTURE PROJECTION MATRIX: 705

ADD VALUE TO ALPHA CHANNEL: 330

CHOOSE TEXTURES AND WEIGHT: 910

BLEND ORIGINAL COLOR USING ALPHA 340

ARCHITECTURE
1200

SYSTEM AND METHOD FOR IMPLEMENTING SHADOWS USING PRE-COMPUTED TEXTURES

BACKGROUND OF THE INVENTION

1. Field of the Invention

The present invention relates generally to computer graphics.

2. Background Art

Computer graphics systems are used to generate the visual images presented in screen displays. In an effort to create the most realistic visual images several techniques such as texture, lighting, and blending are utilized. Casting and rendering shadows (also called "shadowing") is another important part of the process of generating realistic images. Shadows reinforce the visual reality of an image. For example, shadows can be used to give a two-dimensional image the look of a three dimensional image.

In order to render a scene, a mathematical representation of the scene must first be calculated. This mathematical representation defines several attributes for each image or object depicted in the scene. For example, such attributes can define an object's size, shape, color, location within the scene, and/or position and orientation with respect to other objects in the scene. Given the volume and complexity of the mathematical calculations necessary to render a scene, an extensive amount of computer processing is required.

In addition, the computer system must be very fast in order to respond to changing scenes. For example, during flight simulations, the scene is constantly changing in response to the input of the pilot. The computer system must recompute a new scene in response to the pilot's input. Games and other applications involving graphics also have frequently changing shadow effects. As the scene changes, the shadow effects must also be changed, resulting in an even greater demand for computer processing.

As one would expect, given the number of complex mathematical calculations, the time required for rendering a scene can be lengthy. The need to account for shadowing further adds to processing time. When generating animated movies or simulated still images, delays of several seconds, minutes, or perhaps even hours might be acceptable. However, in real-time applications, such as flight simulation or gaming, delays in rendering and ultimately presenting graphic simulations to the user cannot be tolerated.

One approach to shadowing involves the use of projected shadows. Projected shadows are simple to use, but every time the shadow casting object in a scene moves or changes its orientation with respect to the light source, the shadow has to be changed. This requires projecting the object from the view of the light source and reading back the image into a texture. Real-time simulation does not allow for this process to be done every frame.

Therefore, what is needed is a system and method which reduces the amount of time needed to render and present a computer generated scene with shadowing.

BRIEF SUMMARY OF THE INVENTION

The present invention provides an improved system and method for rendering shadows in a computer graphics system. An implementation of generating shadows in real-time is realized by projecting a single pre-computed texture or a set of pre-computed textures. In this way, computing textures at each frame is avoided. The pre-computed texture or set of textures are rotated and/or scaled so that they approximate the shadow created by a shadow caster that has changed its position or orientation with respect to a light source. A shadow caster can be any object that casts a shadow in a scene with respect to light source(s) in the scene.

In embodiments of the present invention, a method for rendering a scene in a computer graphics system using pre-computed textures is provided. A first step entails generating sets for the light source and shadow caster pairs in a simulation frame. Each set provides texture data corresponding to an area of influence created by a shadow caster with respect to its orientation or direction to a given light source. The area of influence is representative of the shadow resulting from a light source and shadow caster pair. Next, each set of directions and associated textures for each light source and shadow caster pair are stored for subsequent access when rendering a scene during run-time. Once a simulation or game has begun, a scene is rendered. Each light source and shadow caster pair in the scene is rendered iteratively. Texture from the stored set of directions and associated textures corresponding to the current light source and shadow caster pair being rendered is used to render the area of influence. Once each of the light source and shadow caster pairs have been rendered, the resulting scene data can be drawn into a frame buffer for subsequent processing and display. In a next step, a determination is made as to whether additional rendering is necessary. For example, a change to the scene (i.e., additional rendering) would be necessary in response to a user's action. If necessary, the next scene would be rendered in accordance with the aforementioned steps and reflects the accepted change to the original scene.

In another embodiment of the present invention, the rendering of the scene involves determining if an area of influence created by a shadow caster is visible in the scene. If so, the closest direction from the stored set of directions and textures corresponding to the light source and shadow caster pair being rendered is selected. Rendering of the scene is then performed using pre-computed texture data associated with the closest direction in the selected set. This process is iteratively performed for each shadow caster and light source pair in the scene.

In yet another embodiment of the present invention, multiple textures are selected to render the scene. Here, a plurality of directions from the set corresponding to the light source and shadow caster pair being rendered are selected. The directions selected are those that are closest to the current position of the shadow caster and the light source. Next, the textures associated with the selected closest directions are used to render the area of influence. A cumulative alpha channel value is generated as a result of drawing the textures for the selected closest directions. Next, for each shadow caster, the cumulative alpha channel value is used to blend the area of influence. Finally, for each shadow caster, the scene is rendered using the blended area of influence. These steps are iteratively repeated for each light source in the next scene.

Further features and advantages of the present invention, as well as the structure and operation of various system, method, and computer logic embodiments of the present invention are described in detail below with reference to the accompanying drawings.

BRIEF DESCRIPTION OF THE DRAWINGS/ FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIGS. 1A–1D are illustrations showing the generation of texture data for respective pairs of light sources and shadow casters according to an embodiment of the present invention.

FIG. 2 is a flowchart of a routine for implementing shadows using pre-computed textures according to an embodiment of the present invention.

FIGS. 3–11 are flowcharts of a routine for implementing shadows for respective light source and shadow caster pairs using for example, the routine illustrated in FIG. 1.

DETAILED DESCRIPTION OF THE INVENTION

Area of Influence

Figure 4:
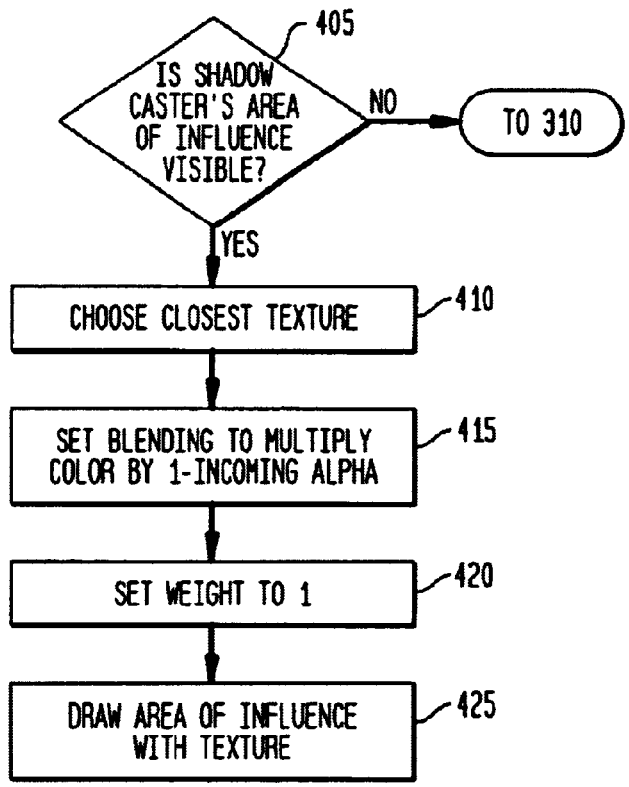

Rendering refers to the drawing phase of computer graphics processing. During this phase, the images in a scene are converted into textures. Textures are made up of pixels. The pixels represent the individual colors that make up the images displayed in the scene. An area of influence or shadow area, is created when an object is placed in the light path emanating from light sources in the scene. To create shadow effects, those pixels in the area of influence are darkened. In order to determine what pixels are in shadow (i.e., should be assigned darker color values) it is necessary to know the orientation or direction of the shadow casting objects with respect to the light sources. Further explanation of this concept will be provided with reference to FIGS. 1A–1D.

FIGS. 1A–1D represent a number of different scenes, each having a particular number of light sources and shadow casters. An area of influence or shadow area, is created when a shadow caster moves into the light path emanating from the light sources. The area of influence changes depending on the position of each shadow caster with respect to a given light source. For example, in FIG. 1A, a single light source (S1) and shadow caster (C1) are shown. The set of directions 0–7 and associated textures A–H represent the areas of influence created as shadow caster (C1) is oriented in eight different directions about the light source (S1).

FIG. 1B illustrates a single light source (S1) and two shadow casters (C1 and C2). Accordingly, a first set could contain directions 0–7 and corresponding textures A–H. This set is representative of the area of influence for the light source (S1) and one of the shadow casters (C1). The light source (S1) and the second shadow caster (C2) pair produces a different area of influence. This area of influence is represented by the set comprising directions 8–12 and corresponding textures I–M.

As shown in FIG. 1C, in the case of two light sources (S1 and S2) and two shadow casters (C1 and C2), four different sets could be used to represent the respective areas of influence. The area of influence created by the light source (S1) and shadow caster (C1) pair is represented by the set composed of directions 0–7 and associated textures A–H. The area of influence created by the light source (S1) and shadow caster (C2) pair is represented by the set composed of directions 8–12 and associated textures I–M.

The areas of influence created by the pairing of the light source (S2) with shadow casters (C1 and C2) could also be determined. However, it should be apparent that the area of influence created by the light source (S2) and the shadow caster (C1) would overlap with the area of influence created by the light source (S1) and the shadow caster (C1). The same is true for the area of influence created by the light source (S2) and shadow caster (C2) in comparison to the area of influence created by the light source (S1) and shadow caster (C2) pair. Therefore, the area of influence for the light source (S1) and shadow caster (C1) pair can be used to represent the area of influence for the light source (S2) and shadow caster (C1) pair. Likewise, the area of influence for the light source (S1) and shadow caster (C2) pair can be used to represent the area of influence for the light source (S2) and the shadow caster (C2).

A fourth scenario involving a different combination of two light sources and two shadow casters is illustrated in FIG. 1D. Here again, the set of directions 0–7 and textures A–H represent the area of influence created by light source (S1) and shadow caster (C1) in eight different directions. The set comprised of directions 8–12 and textures I–M is representative of the areas of influence resulting from the pairing of the light source (S1) and the shadow caster (C2). Additional areas of influence are represented in the set composed of directions 13–16 and textures N–Q. These areas of influence result from the pairing of the light source (S2) and the shadow caster (C2). It should be apparent that no area of influence would result from light source (S2) and shadow caster (C1). An exemplary method for generating shadows using pre-computed textures in accordance with embodiments of the present invention will now be described.

Exemplary Method For Implementing Shadows using Pre-computed Textures

Routine 200 (FIG. 2) is an exemplary method for rendering shadows using pre-computed textures in accordance with an embodiment of the present invention. In real-time graphics applications it is vitally important that scenes be rendered and drawn quickly. To this end, an important advantage is gained by pre-processing, that is, performing many calculations needed to render a scene before an application is run. The present invention will be described using simulation of the image depicted in FIG. 1D as an example. This example is intended for explanation only and is not intended to limit the present invention.

Pre-Processing

In an exemplary embodiment of the present invention, the scene depicted in FIG. 1D is to be displayed in a real-time simulation. Sets of directions and associated textures for respective pairs of the light sources (S1 and S2) and the shadow casters (C1 and C2) are generated in a pre-processing operation 215 prior to run-time. The pre-computed textures are generated by drawing the shadow casters and then reading them into texture memory.

The number of pre-computed textures in a set can vary depending on a number of factors, such as, user preferences, computing resources, and the application in which the present invention is being utilized. Furthermore, the user might think one light source or shadow caster more important to the scene than another. Accordingly, a different number of directions and textures might be calculated for one light source and shadow caster pair as compared to another. In the present example, textures representing the area of influence for light source (S1) and shadow caster (C1) from eight different directions are pre-calculated. Set (1) contains the following directions and textures: direction 0, texture A; direction 1, texture B; direction 2, texture C; direction 3, texture D; direction 4, texture E; direction 4, texture F; direction 5, texture F; direction 6, texture G; and direction 7, texture H. Each texture in the set represents the area of influence created by shadow caster (C1) with respect to light source (S1) from a particular direction. The textures are saved for subsequent use during run-time.

Set (2) contains the following directions and textures: direction 8, texture I; direction 9, texture J; direction 10, texture K; direction 11, texture L; and direction 12, texture M. These textures represent the areas of influence created by light source (S1) and shadow caster (C2) from each of the given directions.

The following directions and textures in set (3) represent the areas of influence created by light source (S2) and shadow caster (C2): direction 13, texture N; direction 14, texture 0; direction 15, texture P; and direction 16, texture Q. As previously discussed, there is no area of influence with respect to the light source (S2) and shadow caster (C1).

Next, the generated sets of directions and associated textures for each light source and shadow caster pair would be stored (step 120).

Upon completion of the preprocessing operation, sets for the respective light source and shadow caster pairs will have been generated and stored. Each set contains one or more pre-computed textures representing the areas of influence for a specific shadow caster and light source pair with respect to a particular orientation or direction. The sets and pre-computed textures associated therewith can then be used to render scenes once simulation has begun. Since fewer computations in real-time are necessary, processing time between scenes or frames can be reduced.

Run-Time

Once the pre-processing operation is completed, actual simulation or running of the graphics application is begun. In step 230, the scene (FIG. 1D) is rendered. The scene can be rendered according to Z buffer or equivalent applications or similar methods that would be apparent to a person of ordinary skill in the relevant arts given this description. During the rendering operation, texture data is needed to draw the scene. Accordingly, texture data for rendering the light sources (S1 and S2) and the shadow casters (C1 and C2) would need to be calculated before these objects can be drawn in the scene. Displaying the shadows created by the objects present in the scene would add a higher degree of visual realism to the scene. To represent these shadows, it will also be necessary to obtain the texture data for the shadow or area of influence created by the objects given their present location in the scene being rendered. In an embodiment of the present invention, shadows are rendered in accordance with step 235. Step 235 is further described below with respect to FIGS. 3–11.

FIG. 3 is a flowchart of a routine 300 for implementing shadows using pre-computed textures according to an embodiment of the present invention (steps 305–345). Routine 300 is executed for each light source on a per frame basis. In this way, each light source's contribution to the scene can be accumulatively represented during rendering.

In step 305 a determination is made as to whether blending of the shadow features is desired. When textures are changed in a scene a "jump " or visual distortion is created. Blending is used to minimize the visual distortion by blending the textures. In this way, the shadow changes from one frame to another are less noticeable. In the case where no blending is to be performed, processing continues with the routine for darkening a scene using texture (step 310). This step is described further below with respect to FIGS. 4–8. In the case where blending is to be performed, steps 315–340 are performed. These steps are described with respect to FIGS. 9–11.

First the case where no blending of the shadow features is to be performed will be described while referring to step 310 of FIG. 3 and FIGS. 4–8. In step 310, for each light source and shadow caster pair, texture data for rendering the area of influence is obtained to darken the scene. During a first iteration, texture data for rendering the area of influence created by light source (S1) and shadow caster (C1) is obtained. Step 310 is further described with reference to FIG. 4.

A determination is made as to whether the area of influence for shadow caster (C1) is visible (step 405). The area of influence refers to the portions of the scene lying in the path of the shadow projected by shadow caster (C1) with respect to light source (S1). If this area of influence is not visible from the viewer's perspective then there is no need to render the area of influence and control returns to step 310. Alternatively, if the area of influence is visible from the viewer's perspective then shadow processing continues with step 410.

In step 410, the pre-computed texture associated with the direction that is closest to the current light direction in the scene being rendered is selected. This step is further described with reference to FIGS. 5 and 6.

In step 505, the current light direction is determined. In an embodiment, the current light direction is determined in accordance with the steps shown in FIG. 6.

First, in step 605 a transformation matrix expressing the difference between the current position and orientation of the shadow caster and its original position and orientation is created. In an embodiment, the transformation matrix can provide both rotation and translation data.

Next, in step 610, the inverse of the transformation matrix is calculated to generate an inverse transformation matrix.

In step 615, a determination is made as to whether the light source is a local light source. A local light source is a light source that is defined by a single point in space. Consequently, light radiates uniformly in all directions.

If the light source is a local light source, then a variable light vector is calculated as the difference between the light source position and the shadow caster's center (step 620).

The variable light vector is then multiplied by the inverse transformation matrix to generate the current light direction (step 625).

If the light source is not a local light source then the light direction is multiplied by the inverse matrix (step 630).

Figure 5:
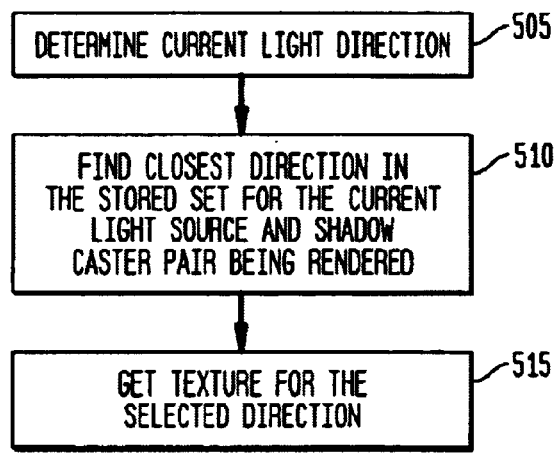
Figure 6:
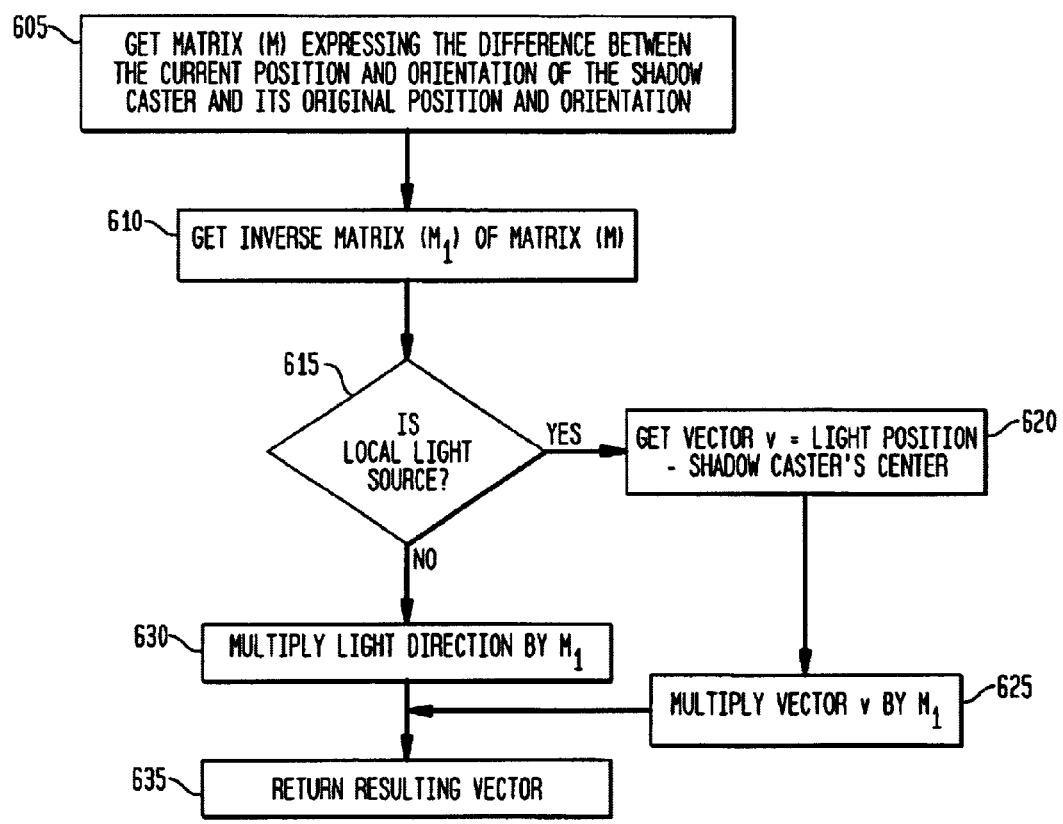

Finally, in step 635, the vector resulting from step 625 or step 630 is returned as the current light direction. This vector (current light direction) could be equal to or close to one of the directions chosen during the pre-processing phase. Description of the present invention will proceed as if the current light direction is in close proximity to direction 4 (FIG. 1D). Processing returns to step 505 (FIG. 5).

Once the current light direction is determined, then in step 510, the direction from the previously stored set of directions and associated textures for light source (S1) and shadow caster (C1) that is closest to the current light direction is selected. For example, direction 4 (FIG. 1D). Methods for identifying the closest direction set to the current light direction will be apparent to a person of ordinary skill in the relevant arts given this description.

Next in step 515, the texture data (texture E) associated with the selected closest direction (direction 4) is retrieved from memory. Once the texture data (texture E) is retrieved, then control returns to step 415.

As shown in FIG. 4, step 415, blending parameters are set to multiply the existing color value of the area of influence by (1—the alpha value) of the retrieved texture data (texture E). Here, blending is used to combine the texture data for the area of influence, in this example, texture E, with the texture data for the shadow casting object (e.g., shadow caster (C1)).

Next, the texture weight is set equal to one (1) (step 420).

The area of influence is then drawn using the retrieved texture data (texture E) (step 425). Further description of step 425 is provided with reference to FIG. 7.

Texture E provides the closest representation of the area of influence currently being rendered. In some cases the selected pre-computed texture will have been calculated for the current view being rendered; in some other cases an exact match is not available. Therefore, in step 705, the texture matrix for texture E is added, rotated, and scaled to compensate for any differences between the current view being rendered and the view represented by the selected pre-computed texture (texture E). An exemplary routine for step 705 will now be described with reference to steps 805–820 of FIG. 8.

To begin, in step 805, a first set of texture coordinates are computed. This first set of texture coordinates represent two control points projected into the selected texture. The two points are selected from the object being rendered, for example, the edge of the roof or hood of shadow caster (C1).

Next, in step 810, a second set of texture coordinates are computed based upon the two control points and the current light direction. The difference between the first and second set of computed texture coordinates is used to scale and rotate the texture matrix.

Next, in step 815, the scale and rotate operation needed to map the first set of texture coordinates into the second set is determined.

Figure 7:
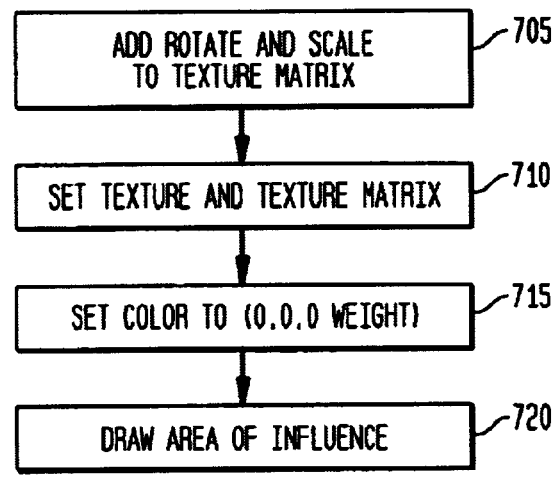
Figure 8:
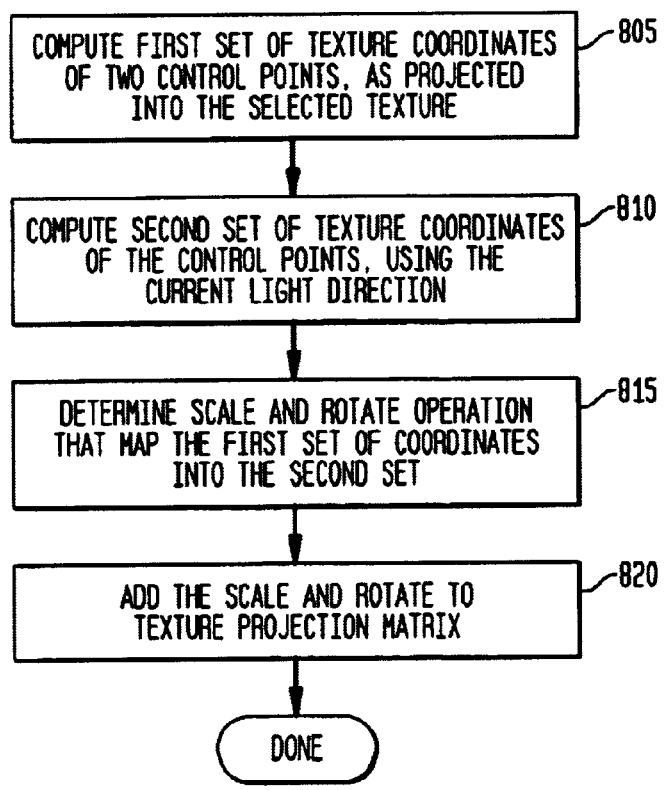
Figure 9:
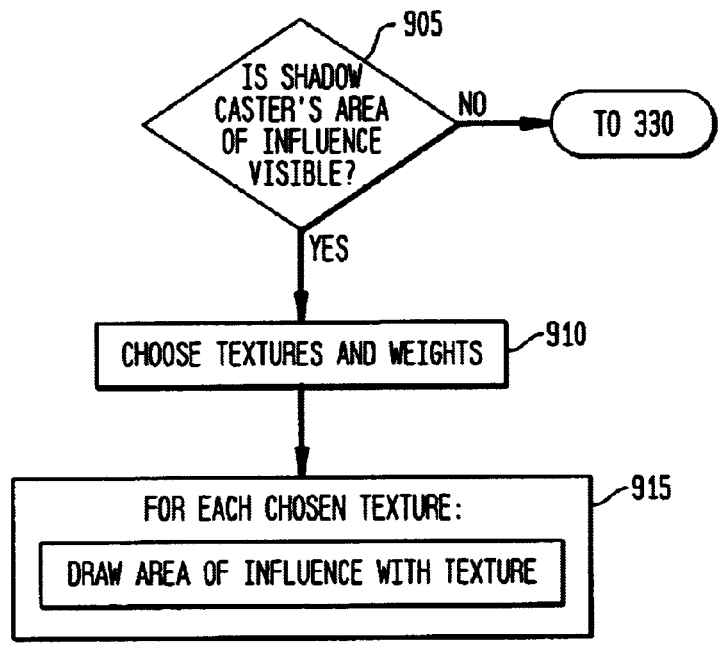
Figure 10:
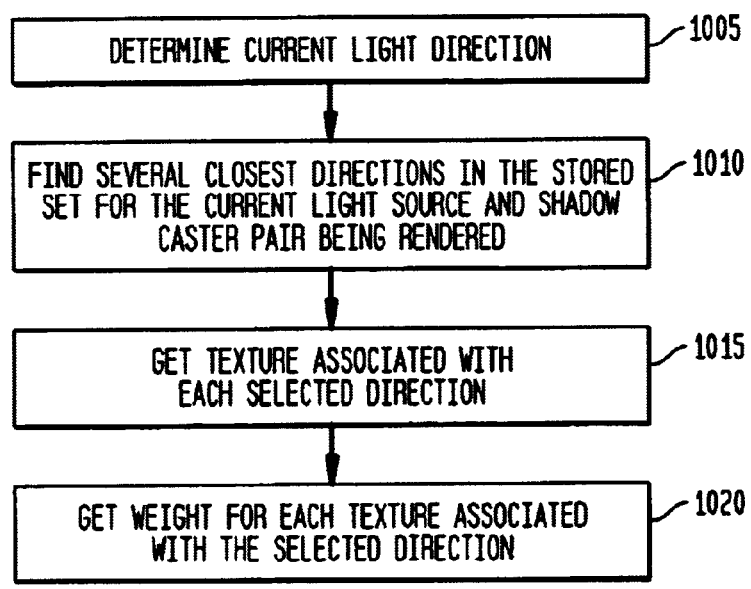
Figure 11:
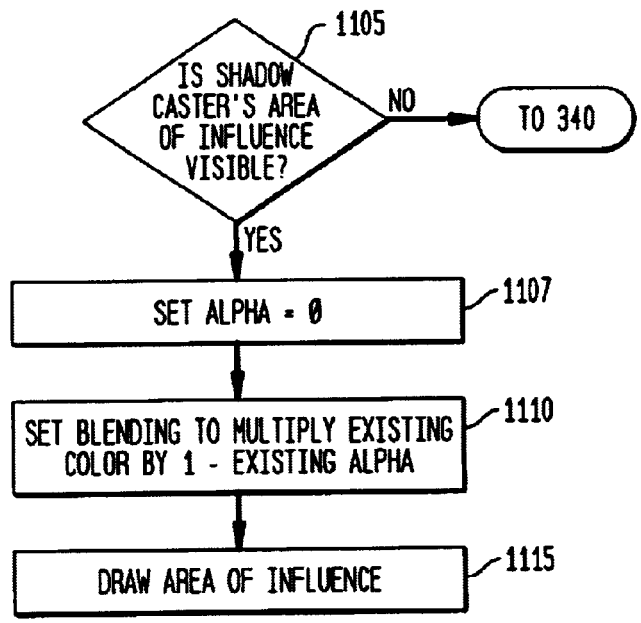

Finally, in step 820, the scale and rotate operation is added to the texture matrix. In this way, the texture projection matrix is scaled and rotated to apply shadowing from a pre-computed texture that approximates a correct shadow for the current view. Upon the completion of step 820, control returns to step 710 (FIG. 7).

In step 710, the texture and texture matrix are set.

Next, the color of the area of influence is set to (0,0,0, weight) (step 715).

Finally, in step 720, the area of influence is rendered and control returns to step 310 (FIG. 1). Step 720 results in the multiplication of the pixel colors in the area of influence by the values stored in the alpha channel of the selected shadow textures, thus darkening the area of influence.

Rendering has now been completed with respect to light source (S1) and shadow caster (C1). Step 310 of FIG. 3 is now repeated in order to darken the scene using texture for light source (S1) and shadow caster (C2). Once routine 300 has been performed for each shadow caster, control would pass to step 235 (FIG. 2).

Upon returning to step 235, processing continues for the remaining light sources. Accordingly, routine 300 would be repeated for light source (S2) and shadow casters (C1) and (C2). The light source (S2) and shadow caster (C1) do not have a visible area of influence and would therefore not be rendered. Regarding the light source (S2) and the shadow caster (C2), one of one of the directions 13–16 and associated textures N–Q would be selected from set (3) and used to darken the scene being rendered. Step 235 is iteratively performed until each light source and shadow caster pair has been rendered. Once this process is done, rendering of the current scene is completed.

As the simulation continues, additional scenes will need to be rendered. For example, in response to a user's input, the position of the objects in the scene might need to be repositioned. Accordingly, a new scene reflecting the position changes and consequently, the shadows, would need to be rendered. Thus, in step 240, a determination is made as to whether another scene is to be rendered. If so, then control returns to step 230 and the next scene is rendered; otherwise, processing ends at step 245.

In order to describe the case where blending of shadow features is desired, FIG. 1D will be rendered again (step 230). To begin, in step 235, all shadow casters (C1 and C2) would be processed for light source (S1). Step 235 is further described below with respect to routine 300 (FIG. 3) steps (315–340). Further details of these steps will be described with respect to FIGS. 9–11 and FIGS. 6–8.

Referring again to step 305, if blending of the shadow features is turned on, processing control passes to step 315. In this case multiple textures from the pre-computed textures will be combined or blended to yield the final texture value of the area of influence.

In step 315, the alpha channel value of all the areas of influence being rendered is reset to zero. In this way, the alpha channel values of the selected pre-computed textures being blended will determine the final alpha channel value of each area of influence.

Next, blending is initialized (step 320).

Processing is next set-up to only allow writing into the alpha channel (step 325).

Next in step 330, for each shadow caster, the alpha channel value for each shadow caster is added to the alpha channel value for the area of influence. In the present example, step 330 is performed for shadow caster (C1) and then repeated for shadow caster (C2). This step will be further described with reference to FIG. 9.

In scenes where multiple light sources are present, it is likely that some of the areas of influence will overlap. The effects of each shadow caster's impact on the common area of influence are combined. Furthermore, it is possible that the resulting shadow is cast out of the viewable area. Thus, in step 905, it is first determined whether the shadow caster's area of influence is visible or not. If not, then there is no need to render the shadow cast by, for example shadow caster (C1). Control would then return to step 330 and processing would continue with regard to shadow caster (C2). If the area of influence for shadow caster (C2) is visible, then processing continues with step 910.

In step 910, textures and weights are chosen for the shadow caster. In this case, shadow caster (C2). Step 910 will be described in further detail with reference to FIG. 10.

In step 1005, the current light direction is determined in accordance with steps 605–635 described above with reference to FIG. 6.

Next, in step 1010, the set containing directions and textures for the light source and shadow caster pair being rendered is obtained. In the present example, the set corresponding to light source (S1) and shadow caster (C2) is obtained (FIG. 1D). From set (2), a plurality of directions that are in close proximity to the current light direction determined in step 1005 are selected (for example, direction 8 and direction 9 from FIG. 1D). The number of directions selected can vary depending on the distribution of directions. Generally two to four directions are selected. In an embodiment, where the directions are distributed in a single plane, two nearest directions are selected. In an alternative embodiment, where the directions are distributed in three dimensions, three or four nearest directions are selected.

Next, in step 1015, the pre-computed textures associated with the selected closest directions are retrieved (e.g., texture I and texture J).

Next, in step 1020, the texture weights for the retrieved pre-computed textures are selected. Control then returns to step 910. Once the pre-computed textures and corresponding weights are obtained, processing continues with step 915.

Step 915 is executed for each selected pre-computed texture. During execution of step 915, the area of influence is drawn in accordance with steps 705–720 described above with reference to FIG. 7. In the previous description of steps 705–720, only one pre-computed texture was used to draw the area of influence. However, in the present example, steps 705–720 would be repeated such that the area of influence drawn (i.e. computed alpha channel value) is a blended product of each of the selected pre-computed textures (i.e., texture I and texture J). Once step 915 is completed, control returns to step 330. Step 330 is repeated until each shadow caster has been processed, then control passes to step 335.

In step 335, writing to the color channels for the area of influence is enabled.

Next, in step 340, for each shadow caster, the original color of the area of influence is blended using the alpha channel value obtained from step 330. An exemplary blending routine will now be described with reference to FIG. 11.

Beginning with the light source (S1) and shadow caster (C1) pair, in step 1105, a determination is made as to whether the shadow caster's (C1) area of influence is visible. If not, then the shadow caster's area of influence is not rendered. Step 1105 is repeated for the light source (S1) and shadow caster (C2) combination. Further description will continue as if the area of influence of light source (S1) and shadow caster (C1) is not visible and the area of influence of light source (S1) and shadow caster (C2) is visible.

In step 1110, blending parameters are set to multiply the existing color of the area of influence being rendered by the value of (1—the existing alpha) which is equivalent to 1—destination alpha in OPENGL.

Finally, in step 1115, the area of influence for the light source (S1) and the shadow caster (C2) is drawn according to steps 705–720 described above with reference to FIG. 7. Having rendered the scene with respect to light source (S1) and shadow casters (C1 and C2) control returns to step 235.

Step 235 would next be repeated for light source (S2) and shadow casters (C1 and C2). Once step 235 is completed for each light source and shadow caster pair, rendering ends at step 245. The rendered scene can then be read into the frame buffer for subsequent processing or display.

Example Graphics Implementations

Figure 12:
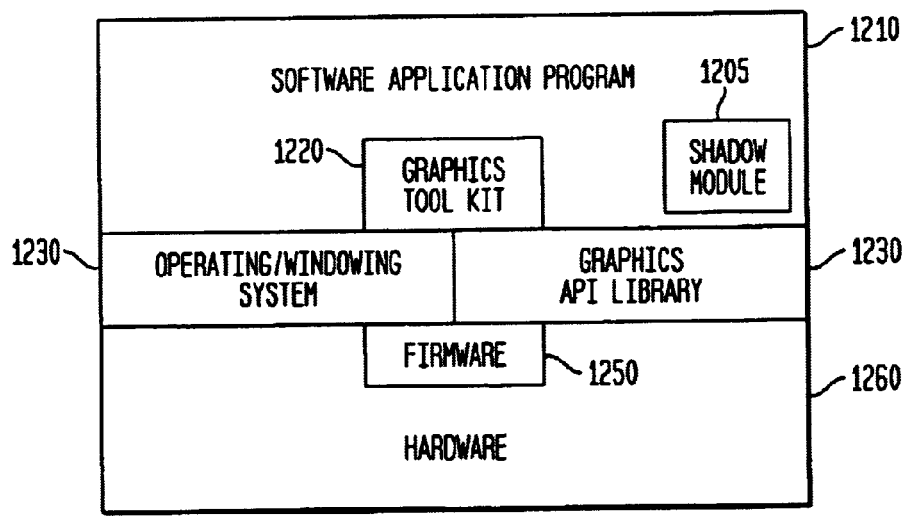
FIG. 12 is a block diagram of an example graphics architecture in an implementation of the present invention.
Figure 13:
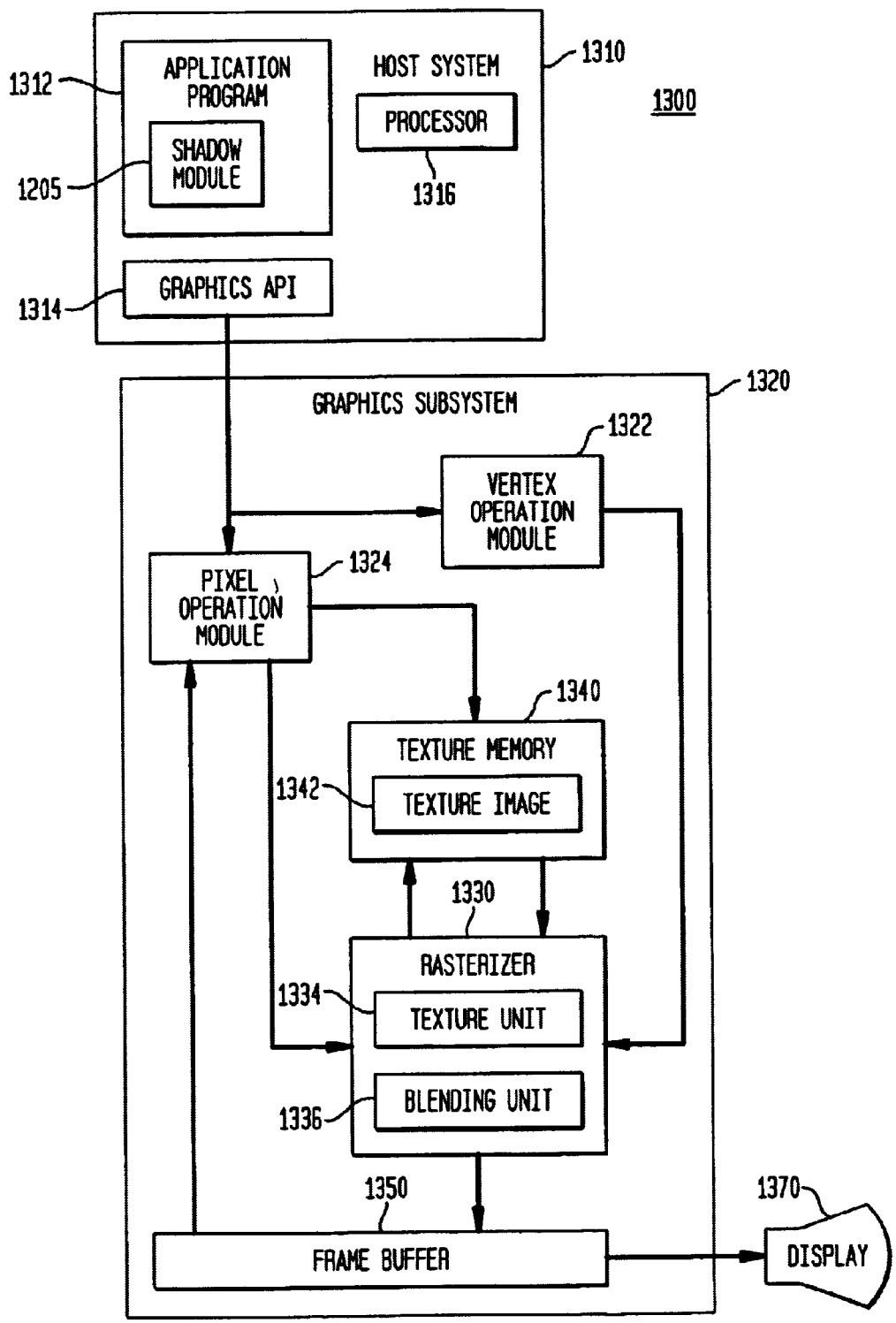
FIG. 13 is a block diagram of a host and graphics subsystem according to an embodiment of the present invention.
Figure 14:
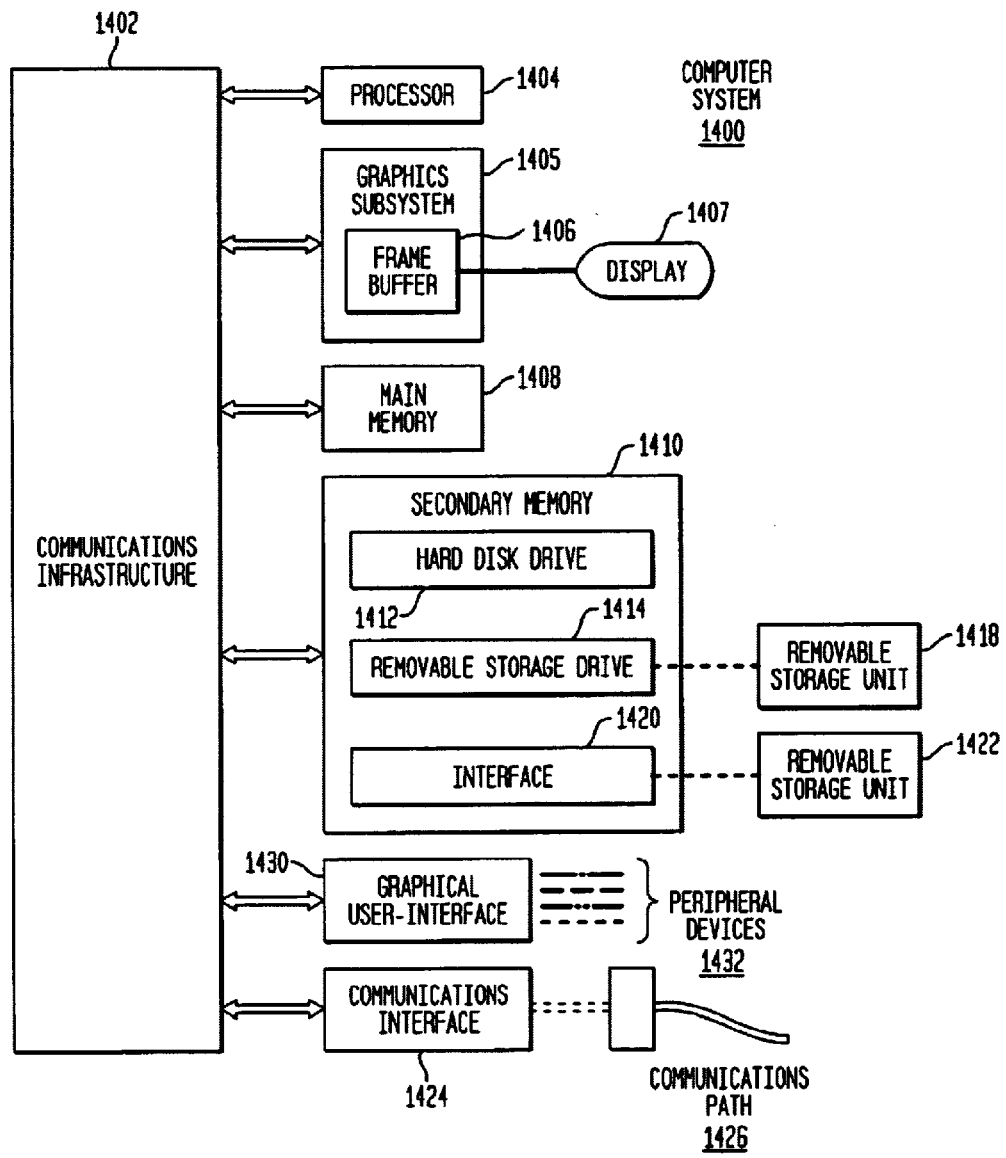
FIG. 14 is a block diagram of a computer system according to an embodiment of the present invention.

The present invention is described with reference to example computer graphics environments (FIGS. 12–14). These example environments are illustrative and not intended to limit the present invention.

FIG. 12 illustrates a block diagram of an example computer architecture 1200 in which the various features of the present invention can be implemented. It is an advantage of the invention that it may be implemented in many different ways, in many environments, and on many different computers or computer systems.

Architecture 1200 includes six overlapping layers. Layer 1210 represents a high level software application program. Layer 1220 represents a three-dimensional (3D) graphics software tool kit, such as OPENGL PERFORMER, available from Silicon Graphics, Incorporated, Mountain View, Calif. Layer 1230 represents a graphics application programming interface (API), which can include but is not limited to OPENGL, available from Silicon Graphics, Incorporated. Layer 1240 represents system support such as operating system and/or windowing system support. Layer 1250 represents firmware. Finally, layer 1260 represents hardware, including graphics hardware. Hardware 1260 can be any hardware or graphics hardware including, but not limited to, a computer graphics processor (single chip or multiple chip), a specially designed computer, an interactive graphics machine, a gaming platform, a low end game system, a game console, a network architecture, server, et cetera. Some or all of the layers 1210–1260 of architecture 1200 will be available in most commercially available computers.

As will be apparent to a person skilled in the relevant art after reading the description of the invention herein, various features of the invention can be implemented in any one of the layers 1210–1260 of architecture 1200, or in any combination of layers 1210–1260 of architecture 1200. In particular, one or more of steps 115–145 can be implemented in any one of the layers 1210–1260 of architecture 1200, or in any combination of layers 1210–1260 of architecture 1200.

In one embodiment, a shadow module 1205 is provided according to the present invention. The shadow module 1205 provides control steps necessary to carry out routine 200. The shadow module 1205 can be implemented in software, firmware, hardware, or in any combination thereof. As shown in FIG. 12, in one example implementation shadow module 1205 is control logic (e.g., software) that is part of an application layer 1210 that provides control steps necessary to carry out routine 200. In alternative implementations, shadow module 1205 can be implemented as control logic in any one of the layers 1210–1260 of architecture 1200, or in any combination of layers 1210–1260 of architecture 1200. In particular, shadow module 1205 can control the carrying out of one or more of steps 215–245 in any one of the layers 1210–1260 of architecture 1200, or in any combination of layers 1210–1260 of architecture 1200 as would be apparent to a person skilled in the art given this description.

FIG. 13 illustrates an example graphics system 1300 according to an embodiment of the present invention. Graphics system 1300 comprises a host system 1310, a graphics subsystem 1320, and a display 1370. Each of these features of graphics system 1300 is further described below.

Host system 1310 comprises an application program 1312, a hardware interface or graphics API 1314, and a processor 1316. Application program 1312 can be any program requiring the rendering of a computer image or scene. The computer code of application program 1312 is executed by processor 1316. Application program 1312 accesses the features of graphics subsystem 1320 and display 1370 through hardware interface or graphics API 1314. As shown in FIG. 13, in one example implementation shadow module 1205 is control logic (e.g., software) that is part of application 1312.

Graphics subsystem 1320 comprises a vertex operation module 1322, a pixel operation module 1324, a rasterizer 1330, a texture memory 1340, and a frame buffer 1350. Texture memory 1340 can store one or more texture images 1342. Texture memory 1340 is connected to a texture unit 1334 by a bus or other communication link (not shown). Rasterizer 1330 comprises texture unit 1334 and a blending unit 1336. The operation of these features of graphics system 1300 would be known to a person skilled in the relevant art given the description herein.

In embodiments of the present invention, texture unit 1334 can obtain either a point sample, a bilinearly filtered texture sample, or a trilinearly filtered texture sample from texture image 1342. Blending unit 1336 blends texels and/or pixel values according to weighting values to produce a single texel or pixel. The output of texture unit 1334 and/or blending module 1336 is stored in frame buffer 1350. Display 1370 can be used to display images or scenes stored in frame buffer 1350.

An embodiment of the invention shown in FIG. 13 has a multi-pass graphics pipeline. It is capable of operating on each pixel of an object (image) during each pass that the object makes through the graphics pipeline. For each pixel of the object, during each pass that the object makes through the graphics pipeline, texture unit 1334 can obtain a single texture sample from the texture image 1342 stored in texture memory 1340.

Referring to FIG. 14, an example of a computer system 1400 is shown which can be used to implement computer program product embodiments of the present invention. This example computer system is illustrative and not intended to limit the present invention. Computer system 1400 represents any single or multi-processor computer. Single-threaded and multi-threaded computers can be used. Unified or distributed memory systems can be used.

Computer system 1400 includes one or more processors, such as processor 1404, and one or more graphics subsystems, such as graphics subsystem 1405. One or more processors 1404 and one or more graphics subsystems 1405 can execute software and implement all or part of the features of the present invention described herein. Graphics subsystem 1405 can be implemented, for example, on a single chip as a part of processor 1404, or it can be implemented on one or more separate chips located on a graphic board. Each processor 1404 is connected to a communication infrastructure 1402 (e.g., a communications bus, cross-bar, or network). After reading this description, it will become apparent to a person skilled in the relevant art how to implement the invention using other computer systems and/or computer architectures.

Computer system 1400 also includes a main memory 1408, preferably random access memory (RAM), and can also include secondary memory 1410. Secondary memory 1410 can include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well-known manner. Removable storage unit 1418 represents a floppy disk, magnetic tape, optical disk, etc., which is read by and written to by removable storage drive 1414. As will be appreciated, the removable storage unit 1418 includes a computer usable storage medium having stored therein computer software and/or data.

In alternative embodiments, secondary memory 1410 may include other similar means for allowing computer programs or other instructions to be loaded into computer system 1400. Such means can include, for example, a removable storage unit 1422 and an interface 1420. Examples can include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

In an embodiment, computer system 1400 includes a frame buffer 1406 and a display 1407. Frame buffer 1406 is in electrical communication with graphics subsystem 1405. Images stored in frame buffer 1406 can be viewed using display 1407.

Computer system 1400 can also include a communications interface 1424. Communications interface 1424 allows software and data to be transferred between computer system 1400 and external devices via communications path 1426. Examples of communications interface 1424 can include a modem, a network interface (such as Ethernet card), a communications port, etc. Software and data transferred via communications interface 1424 are in the form of signals which can be electronic, electromagnetic, optical or other signals capable of being received by communications interface 1424, via communications path 1426. Note that communications interface 1424 provides a means by which computer system 1400 can interface to a network such as the Internet.

Computer system 1400 can include one or more peripheral devices 1432, which are coupled to communications infrastructure 1402 by graphical user-interface 1430. Example peripheral devices 1432, which can from a part of computer system 1400, include, for example, a keyboard, a pointing device (e.g., a mouse), a joy stick, and a game pad. Other peripheral devices 1432, which can form a part of computer system 1400 will be known to a person skilled in the relevant art given the description herein.

The present invention can be implemented using software running (that is, executing) in an environment similar to that described above with respect to FIG. 14. In this document, the term "computer program product" is used to generally refer to removable storage unit 1418, a hard disk installed in hard disk drive 1412, or a carrier wave or other signal carrying software over a communication path 1426 (wireless link or cable) to communication interface 1424. A computer useable medium can include magnetic media, optical media, or other recordable media, or media that transmits a carrier wave. These computer program products are means for providing software to computer system 1400.

Computer programs (also called computer control logic) are stored in main memory 1408 and/or secondary memory 1410. Computer programs can also be received via communications interface 1424. Such computer programs, when executed, enable the computer system 1400 to perform the features of the present invention as discussed herein. In particular, the computer programs, when executed, enable the processor 1404 to perform the features of the present invention. Accordingly, such computer programs represent controllers of the computer system 1400.

In an embodiment where the invention is implemented using software, the software may be stored in a computer program product and loaded into computer system 1400 using removable storage drive 1414, hard drive 1412, or communications interface 1424. Alternatively, the computer program product may be downloaded to computer system 1400 over communications path 1426. The control logic (software), when executed by the one or more processors 1404, causes the processor(s) 1404 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

Various embodiments of the present invention have been described above, which are capable of being implemented on a graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for rendering a scene having light sources and shadow casters in a computer graphics system, comprising the steps of:
   (a) generating at least one set of direction and texture data prior to rendering a scene, wherein each set corresponds to a respective pair of a light source and a shadow caster, wherein said direction data represents a plurality of directions between said light source and said shadow caster, and further wherein said texture data represents each area of influence created by said shadow caster as it is oriented about said light source at each direction of said plurality of directions; and
   (b) rendering said scene using said generated sets.

2. The method of claim 1, wherein for each light source and shadow caster pair, said rendering step (b) comprises the steps of:
   (i) determining a current light direction;
   (ii) selecting a closest direction from one of said generated sets for said light source and shadow caster pair being rendered;
   (iii) retrieving said texture data associated with said selected closest direction; and
   (iv) drawing said area of influence in said scene using said retrieved texture data.

3. The method of claim 2, further comprising the steps of:
   (v) computing a first set of texture coordinates representing two control points projected into said retrieved texture data;
   (vi) computing a second set of texture coordinates representing said two control points projected into said retrieved texture data and oriented with respect to said determined current light direction; and
   (viii) at least one of scaling and rotating said retrieved texture data based on a difference between said first set of texture coordinates and said second set of texture coordinates.

4. The method of claim 1, wherein said rendering step (b) comprises the steps of:
   (1) determining if said area of influence created by said shadow caster and light source being rendered is visible in said scene;
   (2) determining a current light direction;
   (3) selecting a closest direction from said generated set for said light source and shadow caster pair that is being rendered;
   (4) rendering said scene using said generated texture data associated with said closest direction;
   (5) repeating steps (1), (2), (3) and (4) for each shadow caster in said scene; and
   (6) repeating steps (1), (2), (3), (4) and (5) for each light source in said scene.

5. The method of claim 1, wherein said rendering step (b) comprises the steps of:
   (1) determining if said area of influence created by said shadow caster and light source pair being rendered is visible in said scene;
   (2) determining a current light direction;
   (3) selecting a plurality of directions from said generated set for said shadow caster and light source pair being rendered such that said directions are approximately equal to said current light direction;
   (4) for each said texture data associated with said selected plurality of directions, drawing said area of influence to generate a cumulative alpha channel value;
   (5) for each shadow caster, blending said areas of influence using said cumulative alpha channel value;
   (6) for each shadow caster, rendering said scene using said blended areas of influence; and
   (7) repeating steps (1), (2), (3), (4), (5), and (6) for each light source in said next scene.

6. A system for rendering a scene in a computer graphics system, comprising:
   generating means for generating at least one set of direction and texture data prior to rendering a scene, wherein each set corresponds to a respective pair of a light source and a shadow caster, wherein said direction data represents a plurality of directions between said light source and said shadow caster, and further wherein said texture data represents each area of influence created by said shadow caster as it is oriented about said light source at each direction of said plurality of directions; and
   rendering means for rendering said scene using said generated sets.

7. The system of claim 6, further comprising:
   determining means for determining a current light direction;
   selecting means for selecting a direction from one of said generated sets for said light source and shadow caster pair being rendered that is closest to said current light direction;
   retrieving means for retrieving said texture data associated with said direction closest to said current light direction; and
   drawing means for drawing said area of influence in said scene using said retrieved texture data.

8. The system of claim 7, further comprising:
   first computing means for computing a first set of texture coordinates representing two control points projected into said retrieved texture data associated with said direction;
   computing means for computing a second set of texture coordinates representing said two control points projected into said retrieved texture data and oriented with respect to said determined current light direction; and
   at least one of means for scaling and means for rotating said retrieved-texture data based on a difference between said first set of texture coordinates and said second set of texture coordinates.

9. A method for rendering a scene having a light source and a shadow caster in a computer graphics system, comprising the steps of:
   (a) prestoring a set of direction and texture data prior to rendering a scene, wherein said set corresponds to a pair of a light source and a shadow caster and wherein said texture data represents an area of influence created by said shadow caster as said shadow caster is oriented about said light source; and (b) rendering said scene using said prestored set.

10. The method of claim 9, wherein said rendering step (b) comprises the steps of:

(i) determining a current light direction;

(ii) selecting a closest direction from said prestored set;

(iii) retrieving said texture data associated with said selected closest direction; and (iv) drawing said area of influence in said scene using said retrieved texture data.

11. The method of claim 10, further comprising the steps of:

(v) computing a first set of texture coordinates representing two control points projected into said retrieved texture data;

(vi) computing a second set of texture coordinates representing said two control points projected into said retrieved texture data and oriented with respect to said determined current light direction; and (viii) at least one of scaling and rotating said retrieved texture data based on a difference between said first set of texture coordinates and said second set of texture coordinates.

12. The method of claim 9, wherein said rendering step (b) comprises the steps of:

(1) determining if said area of influence is visible in said scene;

(2) determining a current light direction;

(3) selecting a closest direction from said prestored set; and (4) rendering said scene using said prestored texture data associated with said closest direction.

13. The method of claim 9, wherein said rendering step (b) comprises the steps of:

(1) determining if said area of influence is visible in said scene;

(2) determining a current light direction;

(3) selecting directions from said prestored set such that said selected directions are approximately equal to said current light direction;

(4) for each said texture data associated with said selected directions, drawing said area of influence to generate a cumulative alpha channel value;

(5) blending said drawn areas of influence using said cumulative alpha channel value; and (6) rendering said scene using said blended areas of influence.

14. A system for rendering a scene in a computer graphics system, comprising:

generating means for generating a set of direction and texture data prior to rendering a scene, wherein said set corresponds to a pair of a light source and a shadow caster and wherein said texture data represents an area of influence created by said shadow caster as said shadow caster is oriented about said light source;

a memory for storing said set; and rendering means for rendering said scene using said set.

15. The system of claim 14, further comprising:

determining means for determining a current light direction;

selecting means for selecting a direction from said set that is closest to said current light direction;

retrieving means for retrieving said texture data associated with said direction from said set; and drawing means for drawing said area of influence in said scene using said texture data associated with said direction.

16. The system of claim 15, further comprising:

first computing means for computing a first set of texture coordinates representing two control points projected into said texture data associated with said direction;

second computing means for computing a second set of texture coordinates representing said two control points projected into said texture data associated with said direction and oriented with respect to said current light direction; and at least one of means for scaling and means for rotating said texture data associated with said direction based on a difference between said first set of texture coordinates and said second set of texture coordinates.

* * * * *